3,476,013
CONTACT SENSING SYSTEM FOR MACHINE TOOL
William L. Zemberry, Swissvale Borough, Pa., assignor to United States Steel Corporation, a corporation of Delaware
Filed May 23, 1967. Ser. No. 640,746
Int. Cl. B23c 1/20; B23b 39/10, 47/24
U.S. Cl. 90—12
6 Claims

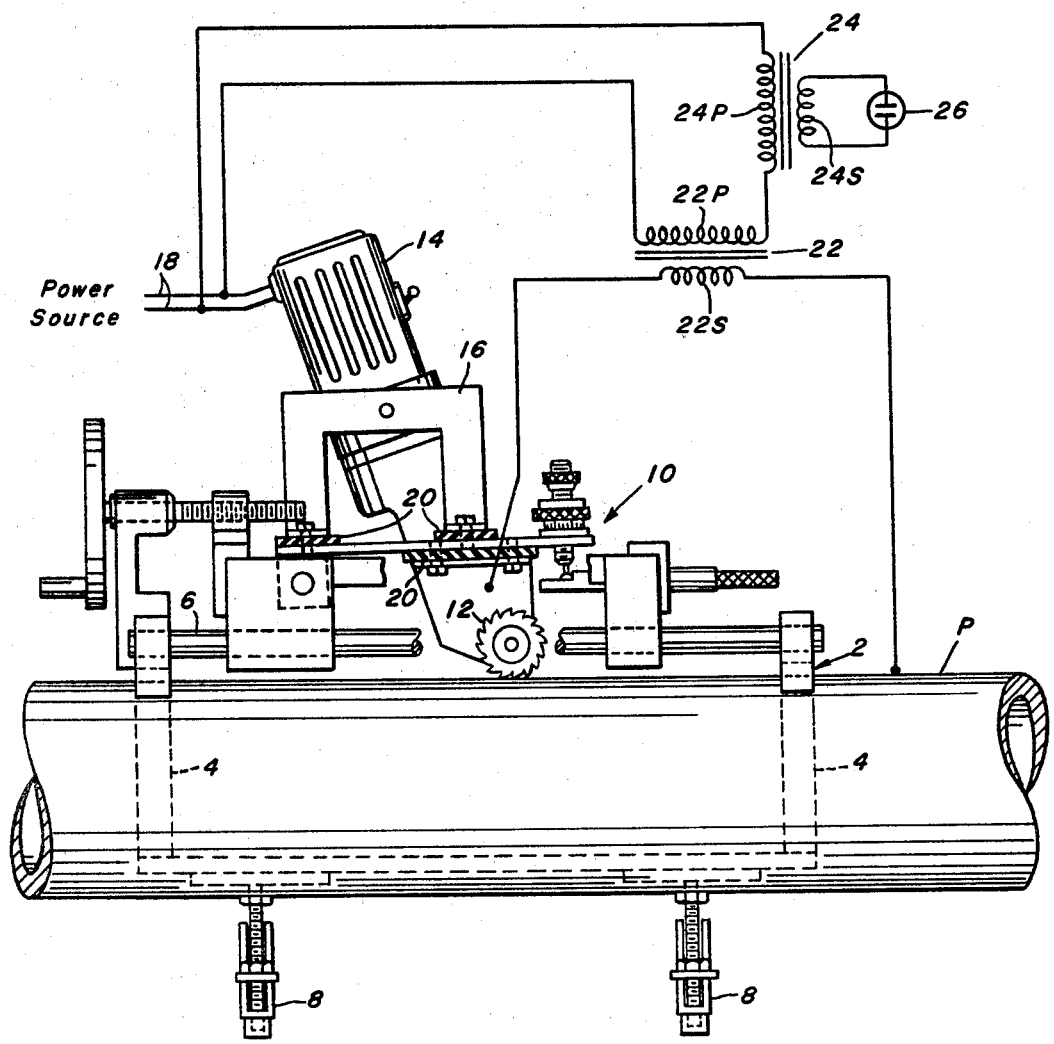

ABSTRACT OF THE DISCLOSURE

A contact sensing apparatus utilizes two transformers with their primaries connected in series to a power source. When the secondary of one transformer is short-circuited by a tool and a workpiece making contact, the resulting impedance change in the circuit lights a neon glow lamp connected across the secondary of the other transformer.

---

This invention relates to apparatus for determining the point of contact between a fixed workpiece and a moving cutting tool.

In some types of precision machine operations, the point at which a cutting tool contacts the workpiece and begins cutting must be accurately determined. Visual observation is inadequate for such determination and feeler gages are not practical when the cutting tool is moving, as with milling cutters, drills, or shapers.

One method of determining the point of contact is to electrically insulate the workpiece from the cutting tool which completes an electrical circuit when it contacts the workpiece, thereby energizing an incandescent lamp. This method is satisfactory with stationary single edge cutting tools that maintain continuous contact with the workpiece, but it is not accurate with rotating multi-edge cutting tools. With such cutting tools, any eccentricity of the tool arbor or of the tool itself will result in a high spot which normally would establish the base point, but may not provide contact of sufficient duration to heat the lamp filament to visible incandescence. A neon glow lamp that visibly illuminates with a minimum amount of contact can be used but it requires a starting voltage far in excess of the voltage permitted for exposed circuits under safety regulations.

It is, therefore, an object of this invention to provide apparatus for safely and accurately determining the point of contact in a precision machining operation.

It is a further object of this invention to provide apparatus for safely and accurately determining the point of contact in a rotating multi-edge cutting precision machine operation.

These and other objects will become more apparent after referring to the following specification and attached drawing in which the single figure is a schematic diagram of the apparatus of my invention.

Referring more particularly to the drawing, reference character P indicates a workpiece such as a pipe in which it is desired to mill an artificial defect. The pipe P is supported in a work holder 2 which consists of two V-blocks 4 connected by bars 6, and two toggle clamps 8. Slidably mounted on the bars 6 is a tool support 10. A milling cutter 12 is driven by means of a motor 14 supported on a bracket 16 carried on support 10. Power for driving the motor 14 is provided by a 110–120 volt, 60 cycle, power source 18. The cutter 12, motor 14, and bracket 16 are electrically insulated from the work holder by means of insulation 20. No other parts of the machine are described since no novelty is claimed therefor in the present application. However, the illustrated machine is similar to that shown in my co-pending application entitled "Portable Milling Machine," Ser. No. 506,097, filed Nov. 2, 1965.

The cutter 12 and pipe P are electrically connected across the secondary winding 22S of a transformer 22 which may be a model F manufactured by Sawyers' Inc., Portland Oreg. Transformer 22 is designed to normally operate with a 110–120 volt 60 cycles per second alternating current connected to its primary winding 22P and to provide approximately 3 volts at its secondary winding 22S. The primary winding of transformer 22 is connected in series with the primary winding 24P of a second transformer 24 across the power source 18. Transformer 24 may be type SSO–8 manufactured by the United Transformer Corporation, New York, N.Y. A neon glow lamp 26 is connected across the secondary winding 24S of transformer 24. The neon glow lamp 26 may be a conventional type NE51 lamp which has an alternating current starting voltage of 65 volts. Transformer 24 steps down the 110–120 volts of the power source to the 65 volts required to illuminate lamp 26.

In operation, the power source 18 is turned on to energize both transformers 22 and 24 and to rotate cutter 12. Because of the high impedance in the two primaries connected in series across the power source, there is not sufficient voltage induced in the secondary 24S to illuminate the neon glow lamp 26. However, when the cutting edge of tool 12 contacts the pipe P, the secondary 22S draws current, thereby decreasing the impedance of the primary of the transformer 22. This decreases the impedance in the circuit consisting of the two transformer primaries 22P and 24P connected in series across the power source 18 and induces a voltage in the secondary of the transformer 24 of sufficient magnitude to light the lamp 26. The apparatus thus safely and precisely determines a base point of a machining operation by means of an exposed voltage far lower than the usual standard maximum of 24 volts. The neon glow lamp 26 also provides an instantaneous signal to indicate contact of the cutting tool 12 on the pipe P.

While a preferred embodiment of my invention has been shown and described, various modifications may be made without departing from the spirit and scope of the invention as set forth in the following claims.

I claim:

1. Apparatus for sensing the point of contact of a cutter on a workpiece which is electrically insulated from the cutter, which comprises a transformer having a primary winding and a secondary winding, means connecting one terminal of the secondary winding to the workpiece, means connecting the other terminal of the secondary winding to the cutter, a source of power connected to the primary winding, and means connected in series with the primary winding and power source and operable by the change in impedance in said primary winding when the cutter contacts said workpiece to indicate said contact.

2. Apparatus according to claim 1 wherein the indicating means comprises a second transformer having a primary winding connected to the power source in series with the primary winding of the first transformer, and a secondary winding connected to a display means.

3. Apparatus according to claim 2 wherein the display means is a neon glow lamp.

4. Apparatus according to claim 3 wherein the cutter is a rotating multi-edge cutting tool.

5. Apparatus according to claim 3 wherein the power source is 110–120 volts 60 cycles per second alternating current.

6. Apparatus according to claim 5 wherein the cutter is a rotating multi-edge cutting tool.

References Cited

UNITED STATES PATENTS

| | | | |
|---|---|---|---|
| 1,428,637 | 9/1922 | Hutchinson | 340—265 |
| 1,553,814 | 9/1925 | Hansen | 340—265 |
| 2,023,662 | 12/1935 | Blood | 340—265 |
| 2,256,120 | 9/1941 | Lovenston | 340—265 |
| 2,294,831 | 9/1942 | Carson | 340—265 |
| 2,401,962 | 6/1946 | Reynolds | 340—265 |
| 2,699,540 | 1/1955 | Hunter | 340—282 |
| 3,141,994 | 7/1964 | Hornfeck et al. | 340—252 |

GERALD A. YOST, Primary Examiner

U.S. Cl. X.R.

77—32.7; 340—265